United States Patent
Yoshinori et al.

(10) Patent No.: US 6,886,352 B2
(45) Date of Patent: May 3, 2005

(54) VEHICLE AIR CONDITIONER

(75) Inventors: Takeshi Yoshinori, Okazaki (JP); Shinji Aoki, Chiryu (JP); Tomohiro Kamiya, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/666,050

(22) Filed: Sep. 17, 2003

(65) Prior Publication Data

US 2004/0069482 A1 Apr. 15, 2004

(30) Foreign Application Priority Data

Sep. 18, 2002 (JP) .................................. 2002-271814

(51) Int. Cl.⁷ .......................... G05D 23/12; B60H 1/32; F25B 29/00
(52) U.S. Cl. .............................. 62/157; 62/179; 62/244; 165/202; 165/266; 165/267; 236/49.3
(58) Field of Search .......................... 62/157, 231, 236, 62/244, 178, 179, 186; 236/51, 49.3; 165/42, 203, 204, 202, 237, 266, 267

(56) References Cited

U.S. PATENT DOCUMENTS

| | | | | |
|---|---|---|---|---|
| 5,138,851 A | * | 8/1992 | Mardikian | 62/244 |
| 5,222,661 A | * | 6/1993 | Wenhart | 236/49.3 |
| 5,305,613 A | * | 4/1994 | Hotta et al. | 62/209 |
| 5,361,593 A | * | 11/1994 | Dauvergne | 62/89 |
| 5,896,750 A | * | 4/1999 | Karl | 62/236 |
| 6,059,018 A | * | 5/2000 | Yoshinori et al. | 165/42 |
| 6,158,225 A | * | 12/2000 | Muto et al. | 62/3.7 |
| 6,745,582 B1 | * | 6/2004 | Urbank et al. | 62/133 |
| 2004/0076015 A1 | | 4/2004 | Aoki et al. | |
| 2004/0083745 A1 | * | 5/2004 | Tomita et al. | 62/161 |
| 2004/0084936 A1 | | 5/2004 | Umebayashi | |
| 2004/0107713 A1 | | 6/2004 | Aoki | |

FOREIGN PATENT DOCUMENTS

| | | |
|---|---|---|
| JP | 11-235981 | 8/1999 |
| JP | 3287110 | 3/2002 |
| JP | 2002-356165 | 12/2002 |
| JP | 2004-114900 | 4/2004 |
| JP | 2004-148970 | 5/2004 |

* cited by examiner

Primary Examiner—Marc Norman
(74) Attorney, Agent, or Firm—Harness, Dickey & Pierce, PLC

(57) ABSTRACT

A vehicle air conditioner is controlled to directly lower the temperature of the interior equipment before a driver enters a vehicle, using an airflow from an air outlet. The air outlet can be placed on and/or against the interior equipment. The interior equipment can be an instrument panel, a steering wheel or a seat.

17 Claims, 2 Drawing Sheets

VEHICLE AIR CONDITIONER

TECHNICAL FIELD

This invention relates to a vehicle air-conditioner and, more particularly, to a vehicle air-conditioner that is operated before the vehicle moves.

BACKGROUND OF THE INVENTION

Conventionally, it is known to perform preliminary air-conditioning in vehicle and a vehicle air conditioner is started before the driver or passenger (hereinafter referred to the driver) enters the vehicle. For example, preliminary air-conditioning is described in Japanese Patent Publication No. 3,287,110.

Preliminary air-conditioning is frequently performed in the summer. The air conditioner is operated, by receiving the starting signal from a driver's transmitter, to lower the temperature of the cabin to a comfortable level by the time the driver enters the vehicle.

In order to make the cabin temperature comfortable, it is necessary to strongly cool the cabin for a long time. When the interval from the air-conditioner starting time to the driver entering time is short, interior equipment such as a steering wheel, a seat and so on can still be hot. Therefore, when the driver enters the vehicle, contact with hot interior equipment may make him uncomfortable. Furthermore, the temperature of the instrument panel be reduced easily and the radiant heat emitted from the instrument panel can undesirably affect the driver.

SUMMARY OF THE INVENTION

In view of the above-mentioned problem, one object of this invention is to effectively lower the temperature of interior equipment in a vehicle during preliminary air-conditioning.

The other object of the invention is to make the driver comfortable when he enters the vehicle.

The present invention is directed to a vehicle air conditioner in which airflow from an air outlet can be controlled to directly lower the temperature of the interior equipment before a driver enters the vehicle.

In one aspect of the invention, an air outlet is placed in the interior equipment.

In another aspect of the invention, an air outlet is placed against the interior equipment.

Further, the interior equipment can be, for example, an instrument panel, a steering wheel or a seat.

Furthermore, an air-conditioner operating time can be controlled, based on a setting time of a timer or a temperature detected by a sensor. The sensor may be a sensor used for an ordinary vehicle air-conditioning control system or cabin environment control system.

Furthermore, when a driver enters the vehicle or the engine starts, the airflow is stopped or is changed to a regular air-conditioning airflow.

Thus, the temperature of an interior equipment can be effectively lowered before the driver enters the vehicle, and the driver does not experience discomfort. That is, the airflow can intensively cool the interior equipment that has a high-load. Preliminary air-conditioning of the cabin can thus be efficiently performed.

BRIEF DESCRIPTION OF THE DRAWINGS

This invention will now be explained in further detail, with reference to the enclosed drawings of which.

DESCRIPTION OF PREFERRED EMBODIMENTS

Figure 1:
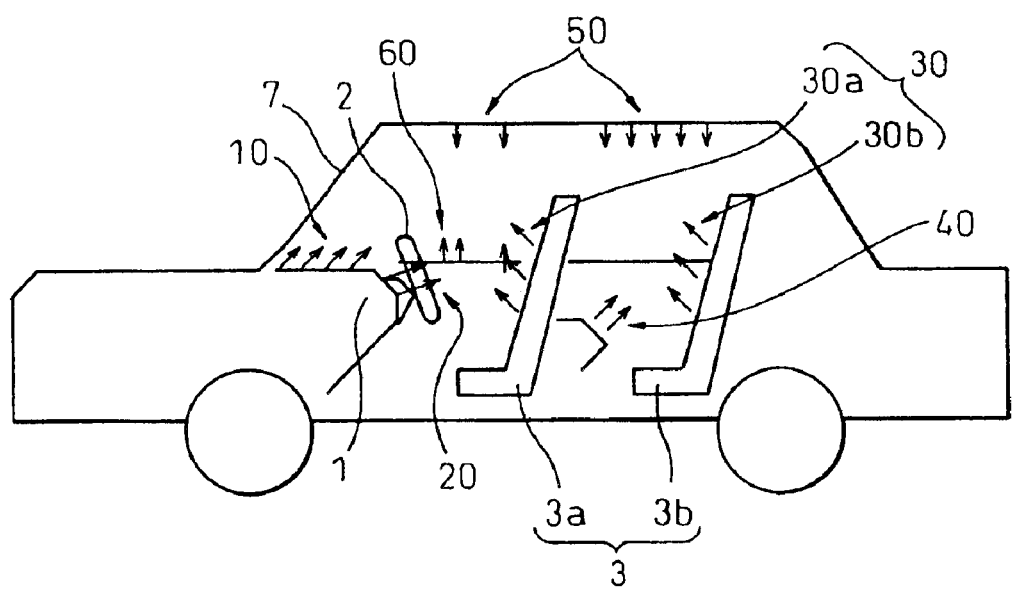
FIG. 1 shows a schematic illustration of airflow from air outlets during preliminary air-conditioning of an embodiment according to the present invention.

Arrows of FIG. 1 show the airflow, from air outlets, which is generated by the vehicle air-conditioner.

Interior equipments to lower temperatures by the preliminary air-conditioning, are, for example, an instrument panel 1, a steering wheel 2 or seats 3 (a front seat 3a and a back seat 3b).

In FIG. 1, the air outlets are arranged on top and front of an instrument panel 1, backrests of seats 3, an interior part facing a backseat 3b, a ceiling board and a door. It is realized that a person skilled in the art can arrange various air outlets in any desired place in vehicle. The airflow from the air outlets of top of the instrument panel 1 is indicated as the airflow 10, the airflow from the air outlets of front of the instrument panel 1 is indicated as the airflow 20, the airflows from the air outlets of the seats 3 (the front seat 3a and the back seat 3b) are indicated as the airflows 30 (the airflow 30a and the airflow 30b), the airflow from the air outlets of the part facing a backseat is indicated as airflow 40, the airflow from the air outlets of the ceiling board is indicated as the airflow 50 and the airflow from the air outlets of the door is indicated as airflow 60.

The airflow 10 can lower the temperature of the top of the instrument panel 1 itself. Furthermore the airflow 10 can hit the windshield to lower the temperature of the windshield.

The airflow 20 can lower the temperature of the front of the instrument panel 1 itself. Furthermore the airflow 20 can hit the steering wheel 2 and the front seat 3a to lower the temperature of the wheel 2 and the seat 3a.

The airflows 30 can lower the temperature of the seats 3 themselves. Furthermore the airflow 30a hits the steering wheel 2 to lower the temperature of the steering wheel 2. The airflow 30b hits the back of the front seat 3a to lower the temperature of the front seat 3a.

The airflow 40 hits the back seat 3b to lower the temperature of the back seat 3b.

The airflow 50 lowers the temperature of the ceiling board itself. Furthermore the airflow 50 hits the instrument panel 2, the steering wheel 3, the seats 3 and the windows such as a windshield 7 to lower the temperature of the instrument panel 2, the wheel 3, the seat 3, the windshield 7 and so on.

The airflow 60 lowers the temperature of the door and hits the window of the door to lower the temperature of the window.

When the airflows are defined as mentioned above, the interior equipments are cooled efficiently. Namely, the instrument panel 1 an the seats 3 reach low temperatures by having air outlets for the airflows 10 to 30. Furthermore the instrument panel 1 is cooled by the airflow 50. The seat 3a is cooled by the airflows 20, 50 and 30b. The seat 3b is cooled by the airflows 40 and 50.

The steering wheel 2 is cooled by the airflow 20 and 50 that is arranged to blow against the wheel. If the air outlets are arranged on the steering wheel 2, the air outlets can lower the temperature of the steering wheel 2. Furthermore some of the air outlets, which are arranged on the front of the instrument panel or the ceiling board, can be the movable ports to face the steering wheel or be concentrated ports for the steering wheel.

The air outlets can be only arranged for the airflow 10, 20 and 30 to intensively lower the temperature of the instrument panel 1, the steering wheel 2 and the seats 3 of which the radiant heats affects strongly the driver.

Figure 2:
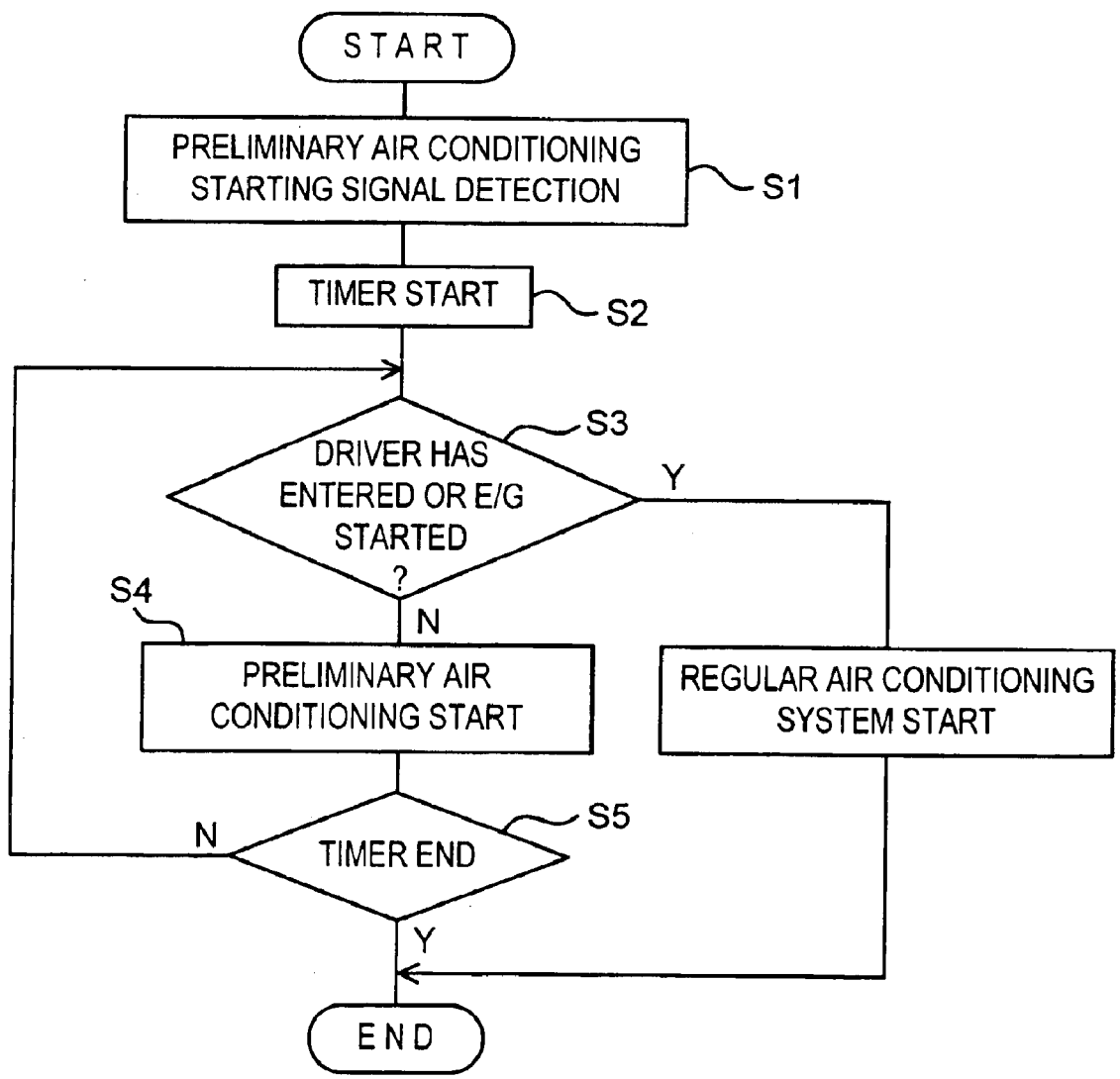
FIG. 2 shows a flow diagram of control of the air-conditioner of an embodiment according to the invention.

FIG. 2 is a flow diagram that shows control of the air-conditioner of an embodiment.

First, before a driver enters a vehicle, the air conditioner starts to operate by a starting signal, which can be transmitted by the driver from outside the vehicle, using a vehicle key with a transmitter, or communication terminal, such as a cellular phone, a personal digital assistance (PDA) and so on. Alternatively, the starting signal can be supplied from a timer attached to the vehicle.

At step S1, a preliminary air-conditioning starting signal is detected. Then, at step S2, a timer starts to count the operating time of the air-conditioner.

At step S3, it is determined that the driver has entered the vehicle or the engine (E/G) has started. The driver can be detected by the signal generated from the driver sensor that is placed in the seat, or the door sensor that detects opening and closing of a door. If the driver is in the vehicle or the engine is running, the air-conditioner cannot be activated for the preliminary air-conditioning.

At step S4, as the driver is not in vehicle and the engine is not running, the air-conditioner is activated.

At step S5, it is determined whether or not the operation time of the air-conditioner exceeds the set time. If the operation time is more than the set time, the air-conditioner is stopped. If the operation time is within set time, the control program returns to step S3 and the preliminary air-conditioning is continued.

In this example, when the driver is in vehicle or the engine is running, the air-conditioner is topped or powered off. However, the air-conditioner can be operated successively, without turn-off, as a regular air-conditioning system.

A timer is used to set up the preliminary air-conditioning operation time in this example. Otherwise, the operation time may be defined by the temperature signal obtained from a temperature sensor, which can measure the surface temperature of the interior equipment. That is, when the temperature of the interior equipment is lower than the set temperature, the air conditioner can be sopped. The temperature sensor can be a contact temperature detector, such as a thermocouple thermometer, a thermistor thermometer and so on, or any of non-contact temperature detector, such as an infrared sensor. The infrared sensor can be a sensor currently used for a vehicle air-conditioning control system or a cabin climate control system.

What is claimed is:

1. A vehicle air conditioner arranged in a vehicle having an engine and having interior equipment including an instrument panel, a steering wheel, and a seat comprising,
    air outlets placed on a surface of the interior equipment in order to lower a temperature of the interior equipment surface by airflow from the air outlets, the air outlets including seat surface air outlets from which airflow is directed to said steering wheel and said seat,
    a control unit having control means that performs preliminary air-conditioning to start airflow from said air outlets in order to lower said interior equipment surface temperature before a driver's ride, after detecting a preliminary air conditioning start signal, wherein the control means starts at least airflow from said seat surface air outlets.

2. A vehicle air conditioner of claim 1, wherein said control means further comprises a timer that stops said preliminary air conditioning when a predetermined time is over.

3. A vehicle air conditioner of claim 1, wherein said control means further comprises a timer that starts after detecting said preliminary air conditioning start signal and stops when either one of the following events (a), (b) and (c) occurs,
    (a) a predetermined time is over,
    (b) a driver enters the vehicle,
    (c) the engine starts.

4. A vehicle air conditioner of claim 1, wherein air-conditioning is switched from said preliminary air-conditioning to regular air conditioning when a driver enters the vehicle or the engine starts.

5. A vehicle air conditioner of claim 1, wherein regular air-conditioning is successively operated after said preliminary air-conditioning and airflow of the preliminary air-conditioning changes to airflow of the regular air-conditioning when a driver enters the vehicle or the engine starts.

6. A vehicle air conditioner arranged in a vehicle having an engine and having interior equipment including an instrument panel, a steering wheel, and a seat comprising,
    first air outlets placed on a surface of the interior equipment in order to lower a temperature of the interior equipment surface by airflow from the first air outlets, and second air outlets from which airflow is directed to the interior equipment surface to lower the interior equipment surface temperature, the first and second air outlets including,
    instrument panel-top air outlets from which airflow is directed to a windshield,
    instrument panel-front air outlets from which airflow is directed to the steering wheel, and
    seat air outlets placed on a surface of the seat,
    a control unit having control means that performs preliminary air-conditioning to start airflow from said first and second air outlets in order to lower the temperature of said interior equipment surface before a driver's ride, after detecting a preliminary air conditioning start signal, wherein the control means starts;
    airflow from said instrument panel-top air outlets,
    airflow from said instrument panel-front air outlets, and
    airflow from said seat air outlets.

7. A vehicle air conditioner of claim 6, wherein said control means further comprises a timer that stops said preliminary air conditioning when a predetermined time is over.

8. A vehicle air conditioner of claim 6, wherein said control means further comprises a timer that starts after detecting said preliminary air conditioning start signal and stops when either one of the following events (a), (b) and (c) occurs,
    (a) a predetermined time is over,
    (b) a driver enters the vehicle,
    (c) the engine starts.

9. A vehicle air conditioner of claim 6, wherein air conditioning is switched from said preliminary air-conditioning to regular air-conditioning when a driver enters the vehicle or the engine starts.

10. A vehicle air conditioner of claim 6, wherein regular air-conditioning is successively operated after said preliminary air-conditioning and airflow of the preliminary air-conditioning changes to airflow of the regular air-conditioning when a driver enters the vehicle or the engine starts.

11. A vehicle air conditioner arranged in a vehicle having an engine and having interior equipment including an instrument panel, a steering wheel, and a seat comprising, first air outlets placed on a surface of the interior equipment in order to lower a temperature of the interior equipment surface by airflow from the first air outlets and second air outlets from which airflow is directed to an interior equipment surface to lower the temperature of the interior equipment surface, the first and second air outlets including, instrument panel-top air outlets from which airflow is directed to a windshield, instrument panel-front air outlets from which airflow is directed to the steering wheel and the seat, and ceiling board outlets from which airflow is directed to the instrument panel, the steering wheel, the seat and a window, seat air outlets placed in a surface of said seat, and door air outlets from which airflow is directed to said window, a control until having control means that performs preliminary air-conditioning to start airflow from said first and second air outlets in order to lower the said interior equipment surface temperature before a driver's ride, after detecting a preliminary air conditioning start signal, wherein the control means starts;

airflow from said instrument panel-top air outlets, airflow from said instrument panel-front air outlets, airflow from said seat air outlets, airflow from ceiling board outlets, and airflow from door air outlets.

12. A vehicle air conditioner of claim 11, wherein said first and second outlets further include back seat air outlets arranged in a front of a back seat, from which airflow is directed to a back seat and said control means generates airflow from the back seat air outlets.

13. A vehicle air conditioner of claim 11, wherein said airflow from said seat air outlets comprises airflow from front seat air outlets and airflow from back seat air outlets, wherein the airflow from the front seat air outlets is directed to said steering wheel to lower the temperature of the steering wheel and airflow from the back seat air outlets is directed behind a backrest of the front seat to lower the temperature of the backrest of the front seat.

14. A vehicle air conditioner of claim 11, wherein said control means further comprises a timer that stops said preliminary air conditioning when a predetermined time is over.

15. A vehicle air conditioner of claim 11, wherein said control means further comprises a timer that starts after detecting said preliminary air conditioning start signal and stops when either one of the flowing events (a), (b) and (c) occurs, (a) a predetermined time is over, (b) a driver enters the vehicle, (c) the engine starts.

16. A vehicle air conditioner of claim 11, wherein air-conditioning is switched from said preliminary air-conditioning to regular air-conditioning when a driver enters the vehicle or the engine starts.

17. A vehicle air conditioner of claim 11, wherein regular air-conditioning is successively operated after said preliminary air-conditioning and airflow of the preliminary air-conditioning changes to airflow of the regular air-conditioning when a driver enters the vehicle or the engine starts.

* * * * *